(12) United States Patent
Shivarama et al.

(10) Patent No.: US 8,705,324 B2
(45) Date of Patent: Apr. 22, 2014

(54) TRACE-GIMBAL ASSEMBLY WITH EXTENSION THAT PREVENTS CONTACT BETWEEN SOLDER JOINTS

(71) Applicant: Seagate Technology LLC, Cupertino, CA (US)

(72) Inventors: Ravishankar Ajjanagadde Shivarama, Eden Prairie, MN (US); Christopher Unger, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/789,184

(22) Filed: Mar. 7, 2013

(65) Prior Publication Data
US 2013/0286803 A1    Oct. 31, 2013

Related U.S. Application Data

(60) Provisional application No. 61/638,200, filed on Apr. 25, 2012.

(51) Int. Cl.
*G11B 11/00* (2006.01)

(52) U.S. Cl.
USPC ............... 369/13.32; 369/13.33; 369/112.27; 369/13.13

(58) Field of Classification Search
USPC .......... 369/13.33, 13.32, 13.24, 13.14, 13.03, 369/13.02, 13.12, 13.13, 13.22, 13.01, 369/112.27, 13.35; 360/125.31, 125.74
See application file for complete search history.

(56) References Cited

U.S. PATENT DOCUMENTS

| | | | |
|---|---|---|---|
| 8,300,503 B2 | 10/2012 | Arai et al. | |
| 8,345,519 B1 * | 1/2013 | Pan | 369/13.33 |
| 8,451,695 B2 * | 5/2013 | Olson | 369/13.01 |
| 2012/0327754 A1 | 12/2012 | Olson | |
| 2013/0223462 A1 * | 8/2013 | Olson | 372/45.01 |

* cited by examiner

*Primary Examiner* — Ali Neyzari
(74) *Attorney, Agent, or Firm* — Hollingsworth Davis, LLC

(57) ABSTRACT

An apparatus has a slider body that includes an upper surface opposed to a media-facing surface. The slider body has an edge joined between the media-facing surface and the upper surface and facing a coupling region. The slider body includes a first bond pad on the edge and a laser submount coupled to the upper surface of the slider body. The laser submount has a second bond pad facing the coupling region. The apparatus includes a trace-gimbal assembly having first and second electrical traces facing the coupling region and electrically coupled to the respective first and second bond pad via first and second solder joints. An extension of the trace-gimbal assembly extends between the first and second solder joints preventing contact therebetween.

20 Claims, 4 Drawing Sheets

TRACE-GIMBAL ASSEMBLY WITH EXTENSION THAT PREVENTS CONTACT BETWEEN SOLDER JOINTS

RELATED PATENT DOCUMENTS

This application claims the benefit of Provisional Patent Application Ser. No. 61/638,200 filed on Apr. 25, 2012, to which priority is claimed pursuant to 35 U.S.C. §119(e) and which is hereby incorporated herein by reference in its entirety.

SUMMARY

One embodiment described herein is generally directed to an apparatus having a slider body that includes an upper surface opposed to a media-facing surface. The slider body has an edge joined between the media-facing surface and the upper surface and facing a coupling region. The slider body includes a first bond pad on the trailing edge, and a laser submount coupled to the upper surface of the slider body. The laser submount has a second bond pad facing the coupling region. The apparatus includes a trace-gimbal assembly having first and second electrical traces facing the coupling region and electrically coupled to the respective first and second bond pad via first and second solder joints. An extension of the trace-gimbal assembly extends between the first and second solder joints preventing contact therebetween.

In another aspect, a head-gimbal assembly has a slider assembly that includes an upper surface opposed to a media-facing surface and a trailing edge joined between the media-facing surface and the upper surface. The slider has a first bond pad disposed on the trailing edge. The head-gimbal assembly includes a laser submount coupled to the upper surface of the slider assembly and having a trailing-edge-parallel surface recessed from the trailing edge. The trailing-edge-parallel surface has a second bond pad disposed thereon. The head-gimbal assembly includes a trace-gimbal assembly having first and second electrical traces facing the trailing edge and electrically coupled to the respective first and second bond pads via first and second solder joints. An extension of the trace-gimbal assembly extends between the first and second solder joints preventing contact therebetween.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to assembly of miniature optical and mechanical components, such as are used in heat assisted magnetic recording (HAMR), also referred to as thermally assisted magnetic recording (TAMR). Generally, a HAMR read-write head includes electromagnetic components similar to a conventional magnetic hard drive read-write head (often referred to as a "slider"). Such components may include a write coil and magnetic read head sensor. A HAMR read write head also includes a source of energy (e.g., laser) used for heating a small spot on a magnetic media (e.g., disk). A HAMR device uses a magnetic storage media with high coercivity, and the hotspot temporarily lowers the coercivity so that data can be written to the heated area. This generally allows for higher areal density to be achieved than with magnetic recording technologies currently in widespread use.

Figure 1:
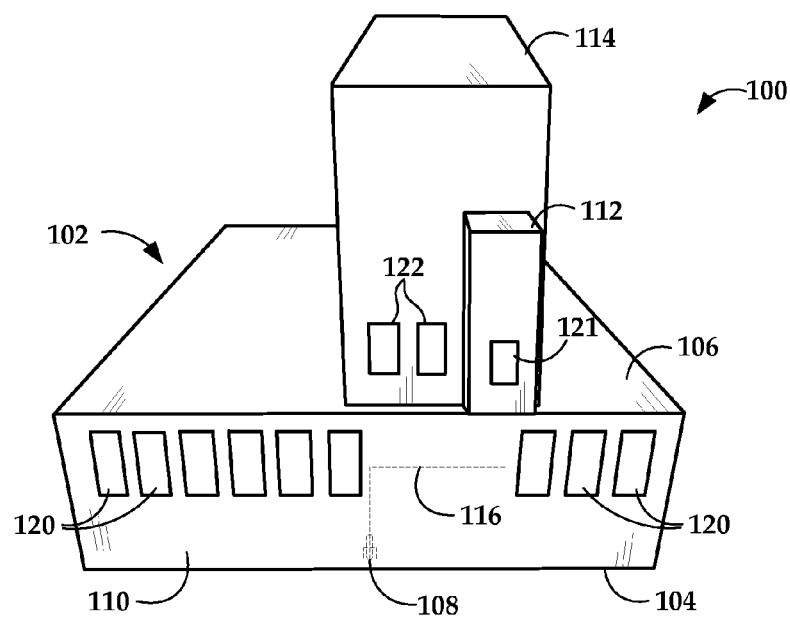
FIG. 1 is a perspective view of a slider assembly according to an example embodiment.

In a number of existing HAMR designs, a laser is manufactured separately from the slider that houses the read/write head. The laser can be physically attached to the slider, or attached away from the slider and optically coupled to the slider (e.g., via an optic fiber). The present disclosure relates to one example of the former arrangement, referred to herein as laser-on-slider (LOS). In FIG. 1, a perspective view shows a LOS assembly 100 according to an example embodiment.

The slider assembly 100 includes a body portion 102 having a media-facing surface 104 and an upper surface 106 which faces away from the media-facing surface 104. The surface 104 faces a magnetic media surface (e.g., disk surface, not shown) during operation. A read/write head region 108 is located at the media-reading surface 104 near a trailing edge 110 of the slider body. The read/write head region 108 includes respective one or more read transducers and write transducers, as well as an optical component (e.g., a near-field transducer) that directs a small beam of energy onto the media surface. The energy is provided by a laser 112 coupled to a submount 114, both of which are coupled to the upper surface 106 of the slider body 102.

The laser 112 directs light to an optical interface (not shown) of the slider body 102, where it is coupled to a waveguide 116 that directs light to the read/write head region 108. The laser 112 in this example is an edge firing laser diode, and may be coupled to the waveguide 116 via a facet, grating, lens or other coupling structure known in the art. Generally, the slider body 102 is an integrated optics device that is formed together with the waveguide 116 and read/write head region 108.

The field of integrated optics relates to the construction of optics devices on substrates, sometimes in combination with electronic components, to produce functional systems or subsystems. The processes used are similar to those used in semiconductor fabrication, e.g., layer deposition, photomasking, etching, etc. For example, a component such as the waveguide 116 may be formed as a layer of materials with appropriate relative refractive indices so that light propagates through the waveguide similarly to an optic fiber.

The laser 112 and submount 114 may also be formed using integrated optics or integrated circuit manufacturing processes. However, in this example, the laser 112 and submount 114 are not formed together with the slider body 102 in the same layer deposition process. The laser 112 and submount 114 are formed separately and later attached together with the slider body 102 to form the slider assembly 100. The slider body 102, laser 112 and submount 114 have electrical connecting pads 120-122 that couple with other structures that are part of what is referred to as a head-gimbal assembly.

Figure 2:
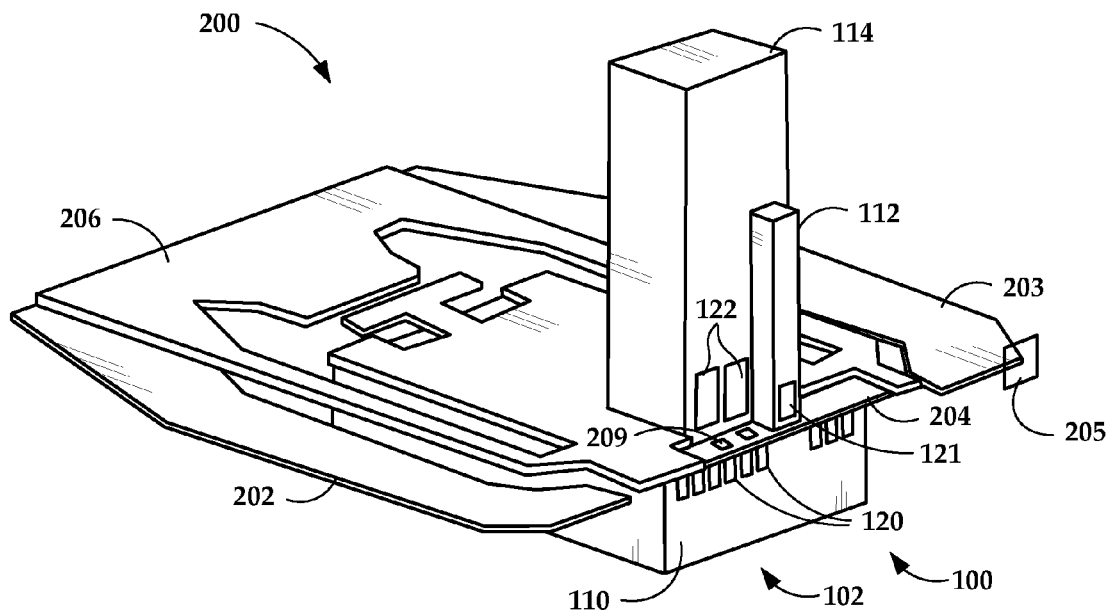
FIG. 2 is a perspective view of a head-gimbal assembly according to an example embodiment.

In FIG. 2, a perspective view shows a head-gimbal assembly 200 that includes the slider assembly 100 of FIG. 1. The head-gimbal assembly 200 includes flex circuit portions 202, 203 that electrically interface with the slider assembly 100 via a trace-gimbal bond pad region 204 (which may be formed integrally with one or both of the flex circuit portions 202, 203). Generally, the portion of the head-gimbal assembly 200 that does not include the slider components 102, 112, 114 is referred to as the trace-gimbal assembly.

Portions of the flex circuit portions 202, 203 that join with the trace-gimbal bond pad region 204 are cut away along plane 205 in this illustration to make it easier to view the trailing edge 110 of the slider body 102. The trace-gimbal bond pad region 204 has first traces 209 on an upper surface, and second traces (see FIG. 6) on an opposite, lower surface. The traces are coupled (e.g., soldered) to the pads 120-122 of the slider body 102, laser 112 and submount 114 during assembly of the head-gimbal assembly 200. The head-gimbal assembly 200 also includes a suspension 206 that mechanically couples with the slider assembly 100. The head-gimbal assembly 200 is held over a media surface (e.g., spinning disk) by an arm to read and write data.

The submount 114 provides mechanical and electrical connections between the laser 112, slider body 102, trace-gimbal bond pads 204 and suspension. An electrically conductive bonding material such as solder creates electrical interconnects between the trace-gimbal assembly and the slider body 102 and between the trace-gimbal assembly and the laser/submount 112, 114. Molten solder is jetted from a tool tip called a capillary. Jetting of the molten solder from the capillary at a given distance from the interconnect location has an inherent variation around a target location.

The illustrated head-gimbal assembly 200 includes two sets of bonding pads: first slider bond pads 120 (e.g., reader, writer, heater, thermal asperity detect), second submount bond pads 121, and third laser bond pad 122 that are accessible from opposite sides of the head-gimbal assembly 200. The bond pads 120, 121, 122 are mounted on different planes, all of which are trailing-edge-parallel in this example. If the bond pads 120-122 reside in the same plane, it is possible material that bonds the bond pads 120-122 with the trace-gimbal assembly may bridge to each other and short out, due to the properties of the jetted molten solder.

Figure 3:
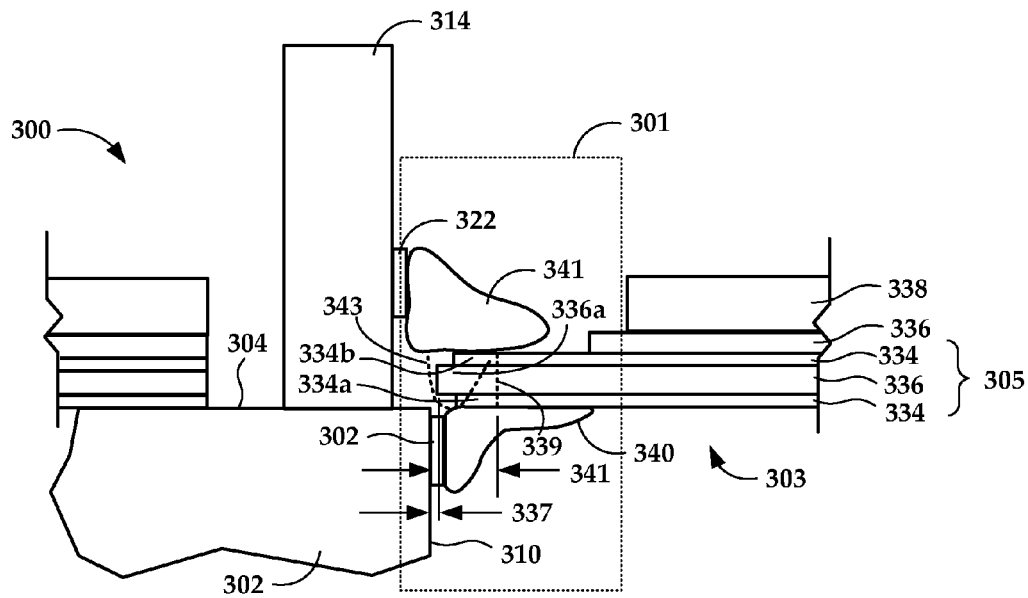
FIGS. 3 and 4 are side views of head-gimbal junctions according to example embodiments.

To at least reduce the possibility of solder bridging, the submount 114 may be recessed from the trailing edge 110 of the slider body 102 to reduce or eliminate the likelihood of electrical bonds bridging to one another. Recessing the submount 114 from the trailing edge 110 allows a flex circuit of a head-gimbal assembly to provide a barrier between the two sets of the bonds. Features of a head-gimbal assembly according to example embodiments are shown in the side views FIGS. 3 and 4. In FIG. 3, a head-gimbal assembly 300 includes a slider body 302 coupled to a trace-gimbal assembly 303. A submount 314 is shown on a top surface 304 of the slider body 302 and slightly recessed from a trailing edge 310 of the slider body 302. A laser is bonded to the submount 314, but is not shown here for purposes of drawing clarity.

The slider body 302 has one or more first bonding pads 320 facing a coupling region 301, e.g., proximate trailing edge 310. The submount 314 has one or more second bonding pads 322 facing the coupling region 301. A laser (not shown) may have one or more similar bonding pads facing the coupling region 301. The first and second bonding pads 320, 322 are shown bonded to exposed first and second traces 334a, 334b of the trace-gimbal assembly 303 via first and second solder joints 340, 341.

The exposed traces 334a are part of conductive layers 334 of the trace-gimbal assembly 303, and at least two of the exposed traces 334a are disposed on opposing surfaces of the flex circuit. The trace-gimbal assembly 303 also includes a structural support 338 and insulating/dielectric layers 336 alternating between the conductive layers 334. The conductive layers 334 and insulating/dielectric layers 336 collectively form a flex circuit 305 of the trace gimbal assembly 303. The conductive layers 334 may be formed of conductive metals such as copper or gold, and the insulating/dielectric layers 336 may be formed from an insulator such as polyamide. The structural support 228 may be formed from a structural material such as stainless steel.

An extension 336a of at least one insulating/dielectric layer 336 extends up to (or near to) the trailing edge 310 of the slider body 302, as indicated by separation distance 337. The extension 336a prevents the solder joints 340, 341 from contacting each other when being applied in a molten state. The separation distance 337 may be zero, or of a small enough value that characteristics of molten solder (e.g., viscosity, surface tension) prevents the solder from passing through the gap between the slider body 302 and extension 336a.

Figure 4:
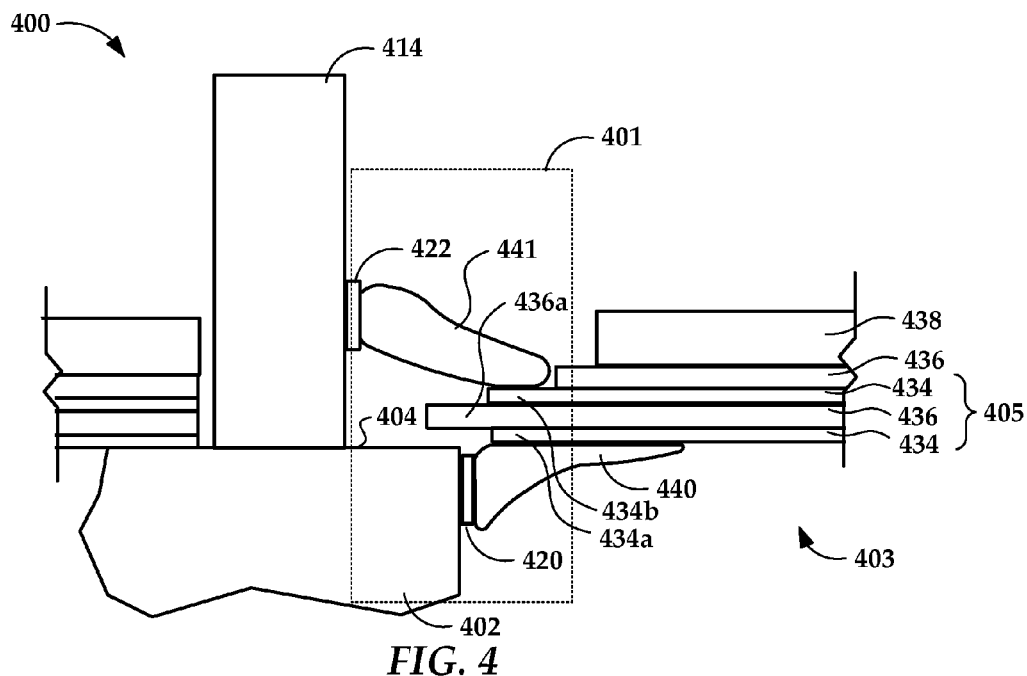

Dashed line 339 represents an example start point of the extension 336a, which is located distance 341 from the trailing edge 310 of the slider 302. If the flex circuit 305 were truncated at line 339, the jetting molten solder may inadvertently bridge as shown by dashed line 343. The extension 336a prevents this type of bridging from occurring. As seen in this figure, the submount 314 is recessed slightly from the trailing edge 310 (e.g., dimension 337 is greater than zero(, and the extension 336a of dielectric layer 336 is near but not crossing over the trailing edge. In FIG. 4, a dielectric portion is shown that extends over the trailing edge of the slider body.

In FIG. 4, a head-gimbal assembly 400 includes a slider body 402 coupled to a trace-gimbal assembly 403. A submount 414 is shown on a top surface of the slider body 402 and is recessed from a trailing edge 410 of the slider body 402. This submount 414 is further recessed from the trailing edge 410 than the submount 314 of FIG. 3 is recessed from corresponding trailing edge 310. A laser is bonded to the submount 414, but is not shown here for purposes of drawing clarity.

Both the slider body 402 and submount 414 have trailing-edge-proximate first and second bonding pads 420, 422 that face a coupling region 401. A laser (not shown) may have one or more similar bonding pads facing the coupling region 401. The first and second bonding pads 420, 422 are shown bonded to exposed first and second traces 434a of the trace-gimbal assembly 403 via first and second solder joints 440, 441. The exposed traces 434a, 434b are part of conductive layers 434 of flex circuit 405, and at least two of the exposed traces 434a are disposed on opposing surfaces of the flex circuit 405. The trace-gimbal assembly 403 also includes insulating/dielectric layers 436 and a structural support 438. The conductive layers 434, insulating/dielectric layers 436, and structural support 438 may be formed of similar materials described for the trace-gimbal assembly 303 shown in FIG. 3.

An extension 436a of at least one insulating dielectric layer 436 extends past the trailing edge 410 of the slider body 402 and overlaps a top surface 404 of the slider body 402. This prevents the solder joints 440, 441 from contacting each other when being applied in a molten state. Without the extensions 336a, 436a of the dielectric layers 336, 436 (or some other layer of the trace-gimbal assembly) there is a possibility that jetting molten solder from opposite sides of the trace-gimbal assembly will bridge together. The recessed submounts 314, 414 help prevent the flow of solder from the bonds on one surface to the bonds on the other.

Figure 5:
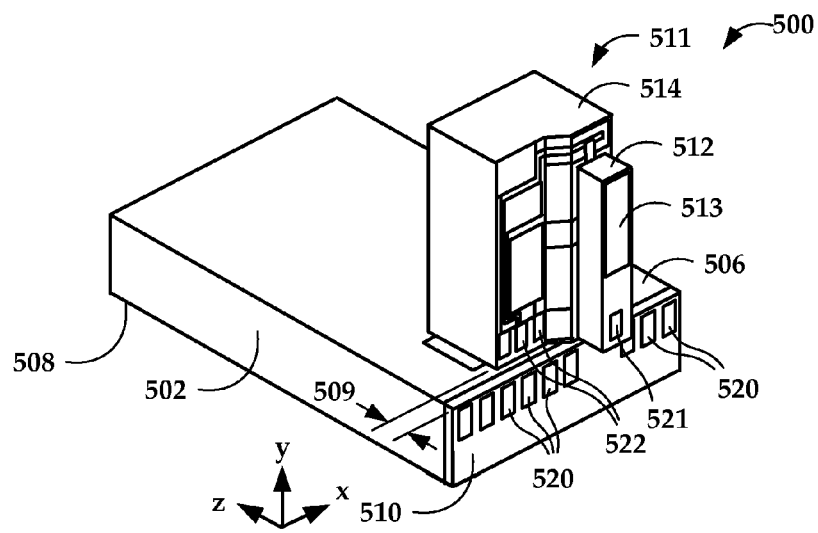
FIG. 5 is a top perspective view of a slider assembly according to an example embodiment.

In reference now to FIG. 5, a slider assembly 500 shows more details of a recessed submount 514 according to an example embodiment. The slider assembly 500 includes a slider body 502, and laser assembly 511. The laser assembly 511 includes a laser submount 514 and laser 512. The submount 514 is mounted to a top surface 506 of the slider body 502, the top surface 506 being opposed to media-facing surface 508. A trailing edge 510 of the slider body 502 includes first bond pads 520 for coupling, e.g., a writer, reader, heater, and thermal asperity detector, to a flex circuit of a trace-gimbal assembly (see FIG. 6). The laser 512 includes a bond pad 521 facing outwards from the trailing edge 510, and the submount 514 includes second bond pads 522 facing in a similar direction, but recessed behind the trailing edge 510, as indicated by spacing distance 509. The laser bond pad 521 may couple a cathode 513 of the laser 512 to the flex circuit of the trace-gimbal assembly, and the submount bond pads 522 may couple other laser circuits (e.g., anode, photodiode) to the flex circuit.

Figure 6:
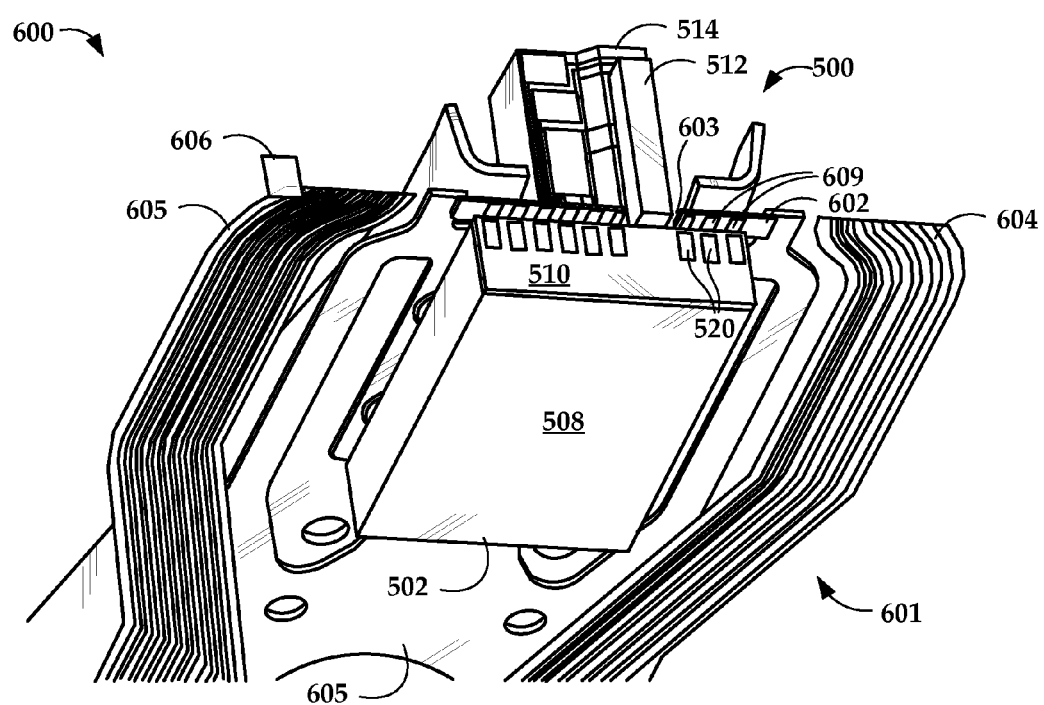
FIG. 6 is a trailing edge perspective view of a head-gimbal assembly according to an example embodiment.

The configuration shown in FIG. 5 has at least two differences from existing slider coupling arrangements. The slider bond pads 520 are in a different planes (different xy-parallel-planes as shown in the figure) than the laser bond pads 521 and submount bond pads 522. This allows for the trace-gimbal assembly to insulate and prevent the flow of solder between the sets of bond pads. In FIG. 6, the slider assembly 500 is shown mated to a trace-gimbal assembly 601 to form a head-gimbal assembly 600 according to an example embodiment.

The trace-gimbal assembly 601 includes flex circuit portions 604, 605 that electrically couple slider assembly 500 to the rest of the storage device. A portion of the flex circuit portions 604, 605 are cut along plane 606 to aid in viewing the coupling between the slider assembly 500 and trace-gimbal assembly 601. Generally, the cut away portions loop around back towards the trailing edge 510 of the slider body 502 where they terminate at trace-gimbal bond pad region 602. First traces 609 are located one side of the trace-gimbal bond pad region 602 and interface with one or more first bonding pads 520 of the slider. Second traces (not shown, see FIG. 2) are located on an opposite side of the trace-gimbal bond pad region 602, and interface with the second bond pads 522 shown in FIG. 5. The trace-gimbal bond pad region 602 includes an extension onto the top edge of the slider body between solder joints of the bond pads preventing contact therebetween. The trace-gimbal bond region 602 also includes a gap 603 that prevents interference between the edge 602 and the laser 512.

Figure 7:
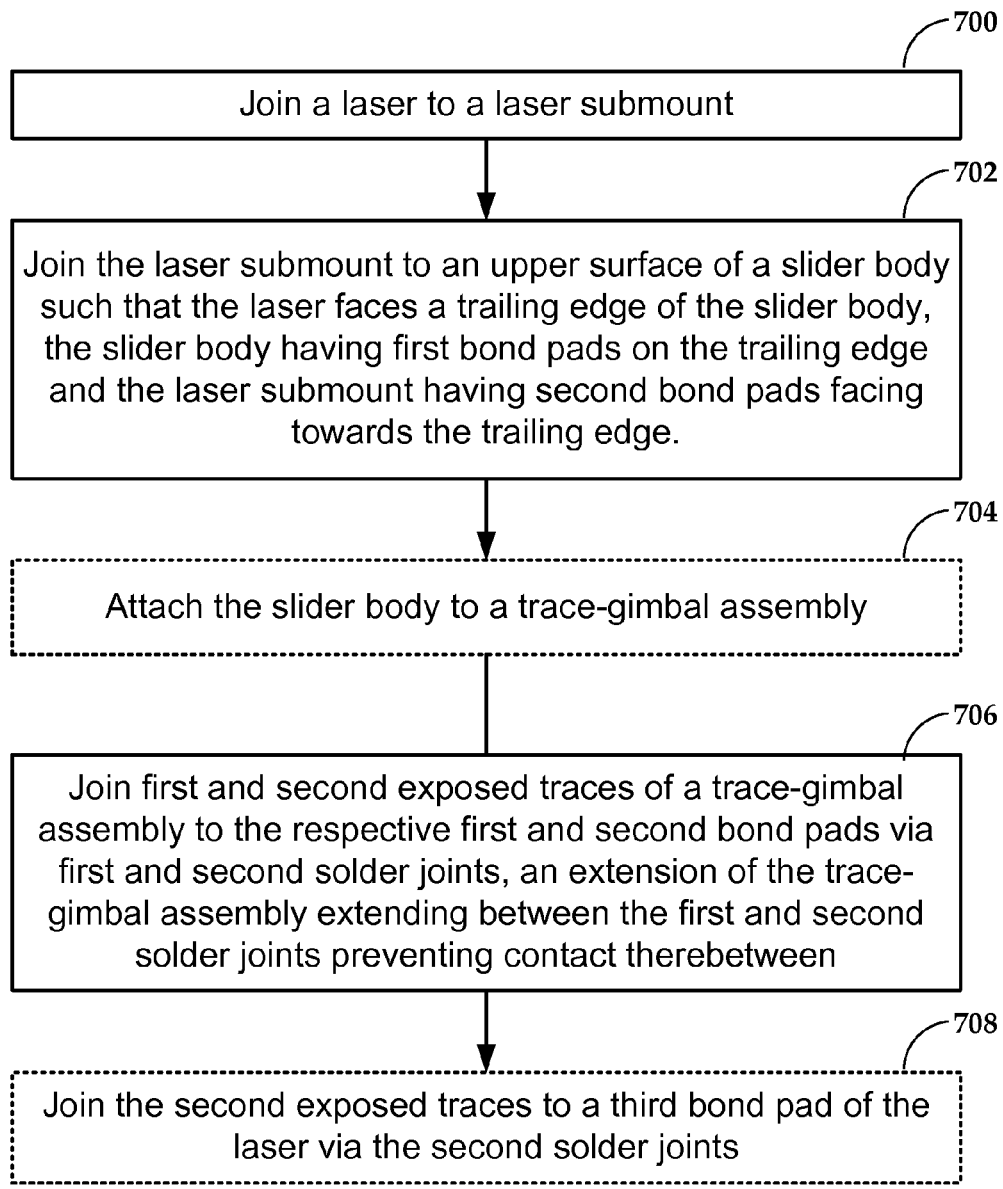
FIG. 7 is a flowchart illustrating a method according to an example embodiment.

In reference now to FIG. 7, a flowchart illustrates a method according to an example embodiment. The method involves joining 700 a laser to a laser submount and joining 702 the laser submount to an upper surface of a slider body such that the laser faces a trailing edge of the slider body. The laser submount has second bond pads facing towards the trailing edge and the slider body has first bond pads on the trailing edge. The method optionally involves attaching 704 the slider body to a suspension or other structural support of a trace-gimbal assembly. First and second exposed traces of the trace-gimbal assembly are joined 706 to the respective first and second bond pads via first and second solder joints. An extension of the trace-gimbal assembly extends between the first and second solder joints preventing contact therebetween. The method optionally involves joining 708 the second exposed traces to a third bond pad of the laser via the second solder joints.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a slider body comprising:
      an upper surface opposed to a media-facing surface;
      an edge joined between the media-facing surface and the upper surface and facing a coupling region; and
      a first bond pad on the edge;
   a laser submount coupled to the upper surface of the slider body, the laser submount comprising a second bond pad facing the coupling region; and
   a trace-gimbal assembly having first and second electrical traces facing the coupling region and electrically coupled to the respective first and second bond pad via first and second solder joints, wherein an extension of the trace-gimbal assembly extends between the first and second solder joints preventing contact therebetween.

2. The apparatus of claim 1, wherein at least part of the extension overlaps the upper surface of the slider body.

3. The apparatus of claim 2, further comprising a laser coupled to the laser submount such that the laser extends beyond the edge of the slider body, wherein the edge comprises a trailing edge.

4. The apparatus of claim 3, wherein the extension comprises a gap that prevents interference between the extension and the laser.

5. The apparatus of claim 3, wherein the laser is coupled to a waveguide that extends from the upper surface of the slider body to the media-facing surface of the slider body.

6. The apparatus of claim 1, wherein the trace-gimbal assembly comprises a flex circuit with at least two conducting layers alternating between at least two dielectric layers, one of the dielectric layers comprising an extended portion that extends towards the slider body beyond respective edges of the other of the dielectric layers, wherein the extension of the trace-gimbal assembly includes the extended portion of the flex circuit.

7. The apparatus of claim 6, further comprising a laser coupled to the laser submount such that the laser extends beyond the edge of the slider body, wherein the extended portion comprises a gap that prevents interference between the extension and the laser.

8. The apparatus of claim 1, wherein the first bond pad couples the trace-gimbal assembly to any combination of a reader, a writer, a heater, and a thermal asperity detector of the slider body.

9. The apparatus of claim 1, wherein the second bond pad couples the trace-gimbal assembly to at least one of an anode of the laser, a cathode of the laser, and a photodiode.

10. The apparatus of claim 9, further comprising a laser coupled to the laser submount, the laser comprising a third bond pad electrically coupled to the second electrical traces.

11. The apparatus of claim 1, wherein the first and second traces are disposed on opposite sides of a flex circuit.

12. A head-gimbal assembly, comprising:
    a slider assembly comprising:
       an upper surface opposed to a media-facing surface;
       a trailing edge joined between the media-facing surface and the upper surface and having a first bond pad disposed thereon; and
       a laser submount coupled to the upper surface of the slider assembly and having a trailing-edge-parallel surface recessed from the trailing edge, the trailing-edge-parallel surface having a second bond pad disposed thereon; and a trace-gimbal assembly having first and second electrical traces facing the trailing edge and electrically coupled to the respective first and second bond pads via first and second solder joints, wherein an extension of the trace-gimbal assembly extends between the first and second solder joints preventing contact therebetween.

13. The head-gimbal assembly of claim 12, wherein at least part of the extension overlaps the upper surface of the slider assembly.

14. The head-gimbal assembly of claim 13, further comprising a laser coupled to the laser submount such that the laser extends beyond the trailing edge of the slider assembly.

15. The head-gimbal assembly of claim 14, wherein the extension comprises a gap that prevents interference between the extension and the laser.

16. The head-gimbal of claim 12, wherein the trace-gimbal assembly comprises a flex circuit with at least two conducting layers alternating between at least two dielectric layers, one of the dielectric layers comprising an extended portion that extends towards the slider assembly beyond respective edges of the other of the dielectric layers, wherein the extension of the trace-gimbal assembly includes the extended portion of the flex circuit.

17. The head-gimbal of claim 16, wherein extended portion overlaps the upper surface of the slider assembly.

18. The head-gimbal of claim 17, further comprising a laser coupled to the laser submount such that the laser extends beyond the trailing edge of the slider assembly, wherein the extended portion comprises a gap that prevents interference between the extension and the laser.

19. The head-gimbal of claim 12, wherein the first bond pads couple the trace-gimbal assembly to any combination of a reader, a writer, a heater, and a thermal asperity detector of the slider assembly, and wherein the second bond pads couple the trace-gimbal assembly to at least and anode and a cathode of the laser.

20. A method comprising:
joining a laser to a laser submount;
joining the laser submount to an upper surface of a slider body such that the laser faces a trailing edge of the slider body, the laser submount having second bond pads facing towards the trailing edge and the slider body having first bond pads on the trailing edge; and
joining first and second exposed traces of the trace-gimbal assembly to the respective first and second bond pads via first and second solder joints, an extension of the trace-gimbal assembly extending between the first and second solder joints preventing contact therebetween.

* * * * *